United States Patent

Farmer et al.

[11] Patent Number: 5,714,433
[45] Date of Patent: Feb. 3, 1998

[54] ACTIVATED CARBON TREATED BY CARBON DIOXIDE FOR THE STABILIZATION OF TREATED WATER PH

[75] Inventors: Richard W. Farmer, Gibsonia; Susan L. Kovacic, McKees Rocks; Thomas M. Matviya, Pittsburgh, all of Pa.; Netar P. Wadhwa, Barboursville, W. Va.

[73] Assignee: Calgon Carbon Corporation, Pittsburgh, Pa.

[21] Appl. No.: 597,115

[22] Filed: Feb. 6, 1996

[51] Int. Cl.$^6$ ............................... B01J 20/02; B01J 21/18
[52] U.S. Cl. ........................ 502/430; 502/416; 502/426; 502/432; 502/433; 502/434; 502/180; 423/460
[58] Field of Search ............................ 502/416, 426, 502/430, 432, 433, 434, 180; 423/460

[56] References Cited

U.S. PATENT DOCUMENTS

| | | | |
|---|---|---|---|
| 5,164,355 | 11/1992 | Farris et al. | 502/416 |
| 5,368,739 | 11/1994 | Dussert et al. | 210/660 |

*Primary Examiner*—Glenn Caldarola
*Assistant Examiner*—In Suk Bullock
*Attorney, Agent, or Firm*—Titus & McConomy

[57] ABSTRACT

Treatment of a wet activated carbon with carbon dioxide or with carbon dioxide followed by air results in a carbon having a reduced contact pH. The activated carbon is characterized by a modified contact pH less than about 9.0 and typically between about 7.3 and 9.0. Use of this carbon in a water treatment system eliminates the excessive effluent water pH rise which commonly occurs with activated carbon.

2 Claims, 2 Drawing Sheets

ACTIVATED CARBON TREATED BY CARBON DIOXIDE FOR THE STABILIZATION OF TREATED WATER PH

FIELD OF THE INVENTION

The present invention relates to a process for producing an activated carbon for the stabilization of pH in water treatment processes. More particularly, this invention relates to the production of a surface-modified, activated carbon having a reduced contact pH using carbon dioxide or using carbon dioxide with a subsequent air treatment.

BACKGROUND OF THE INVENTION

In the water treatment industry, whether municipal, industrial, or remediation, the continued use of standard carbon products causes the effluent pH to increase relative to the influent water pH and often the effluent water pH exceeds 9. This pH excursion occurs with virgin and reactivated carbon and is independent of the raw material. For example, pH excursions have been identified or associated with activated carbons that are made from bituminous coal, sub-bituminous coal, peat, wood, and coconut. The use of carbon having a reduced contact pH to stabilize the pH in water treatment has become available to assist in overcoming these problems, see, e.g., U.S. Pat. Nos. 5,368,738, 5,368,739 and 5,466,378.

Work with these new modified activated carbons has shown that the carbon surface oxidizes at high temperatures with oxygen or air, at ambient temperature with oxygen or air, or with other oxidants such as hypochlorite, nitric acid, and ozone. With this oxidation, the surface of the activated carbon is changed such that the affinity or adsorption capacity for anions such as sulfate is reduced. The adsorption of these anions has been associated with pH excursions. Problems caused by the pH excursions include reduced throughput due to recycle of the high pH water, down time in operation of dialysis systems as the pH is brought into control, wasting water that is high in pH and does not meet the requirements of reverse osmosis systems for high purity water, and monetary fines for exceeding permitted pH levels in wastewater discharge. Historically, the high pH water is alleviated through excessive back washing of the carbon or neutralization of the water through the use of strong acids such as hydrochloric acid or sulfuric acid or a weaker acid such as carbonic acid. These processes are both time consuming and expensive.

Specific characteristics of pH excursions have been described in U.S. Pat. Nos. 5,368,738, 5,368,739 and 5,466,378. In summary, the patents teach that a pH increase in the effluent water from an activated carbon water treatment system is triggered by the presence of anions such as chloride, nitrate, sulfate which occur naturally in water. The art also teaches that activated carbon characterized by a contact pH about 8.5 to 9.0 will exhibit pH excursions with water containing anions such as those stated above. Furthermore, the higher the carbon contact pH the greater the extent of the excursion. U.S. Pat. Nos. 5,368,738 and 5,466,378 teach that the contact pH of the carbon can be reduced by oxidation at elevated temperature. U.S. Pat. No. 5,368,739 teaches that the carbon contact pH can be reduced by oxidation at or near ambient temperature.

Accordingly, it is an object of the present invention to provide a process for producing a modified activated carbon having a contact pH between 6.0 and 9.0. It is also an object of the invention to provide a process for producing a modified activated carbon to eliminate process related problems that are associated with elevated temperature oxidation, such as reduced carbon yield, and to overcome the long treatment times or high gas volumes that are associated with oxidation at or near ambient temperature. It is a further object of the invention to provide a process for producing a modified activated carbon which is highly efficient and cost effective for use in the prevention of pH excursions in water treatment systems.

SUMMARY OF THE INVENTION

The present invention provides a method using carbon dioxide without the presence of oxygen for oxidation to produce a modified activated carbon especially useful in water treatment systems. The process comprises contacting a wetted activated carbon with carbon dioxide. The carbon dioxide reacts with the carbon surface and neutralizes the surface sites that normally remove anions during water treatment causing the water pH to increase. Preferably, the wetted activated carbon is contacted with the carbon dioxide at or near ambient temperatures. Alternatively, the wetted carbon is contacted with the carbon dioxide and then air. The resulting modified carbon is highly effective at minimizing water treatment system pH fluctuation.

The treated activated carbon of the present invention is characterized by a reduced contact pH. The contact pH is measured after contacting activated carbon with a sodium sulfate solution for 30 minutes, as described hereinafter in the Analytical section. In particular, the treated activated carbon is characterized by a contact pH less than about 9.0. The activated carbon can then be used in adsorption/filtration systems for the purification of water. The pH of the water from such a water treatment system is then controlled to levels that are acceptable to the user. Other features of the invention will become apparent from a perusal of the presently preferred embodiments of the invention taken in connection with the accompanying drawings.

PRESENTLY PREFERRED EMBODIMENTS

Experimental

Figure 1:
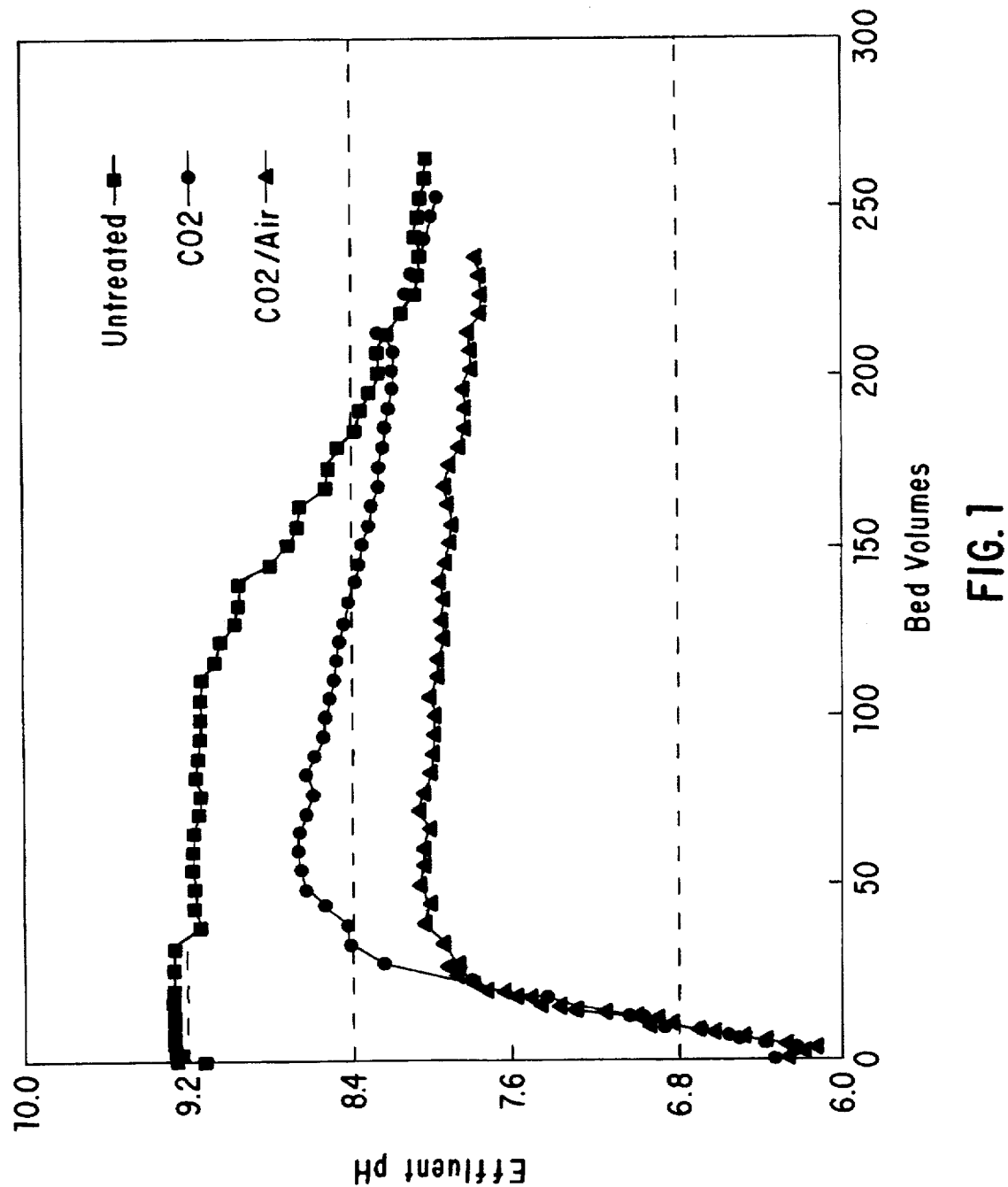
FIG. 1 graphically illustrates the pH profile that occurs with the volume of treated water for virgin carbon and also the carbon of the present invention. The effluent water pH profiles in FIG. 1 are for a commercially available activated carbon, an activated carbon treated with carbon dioxide by the method of the present invention and also for an activated carbon treated with carbon dioxide and then air by the method of the present invention.
Figure 2:
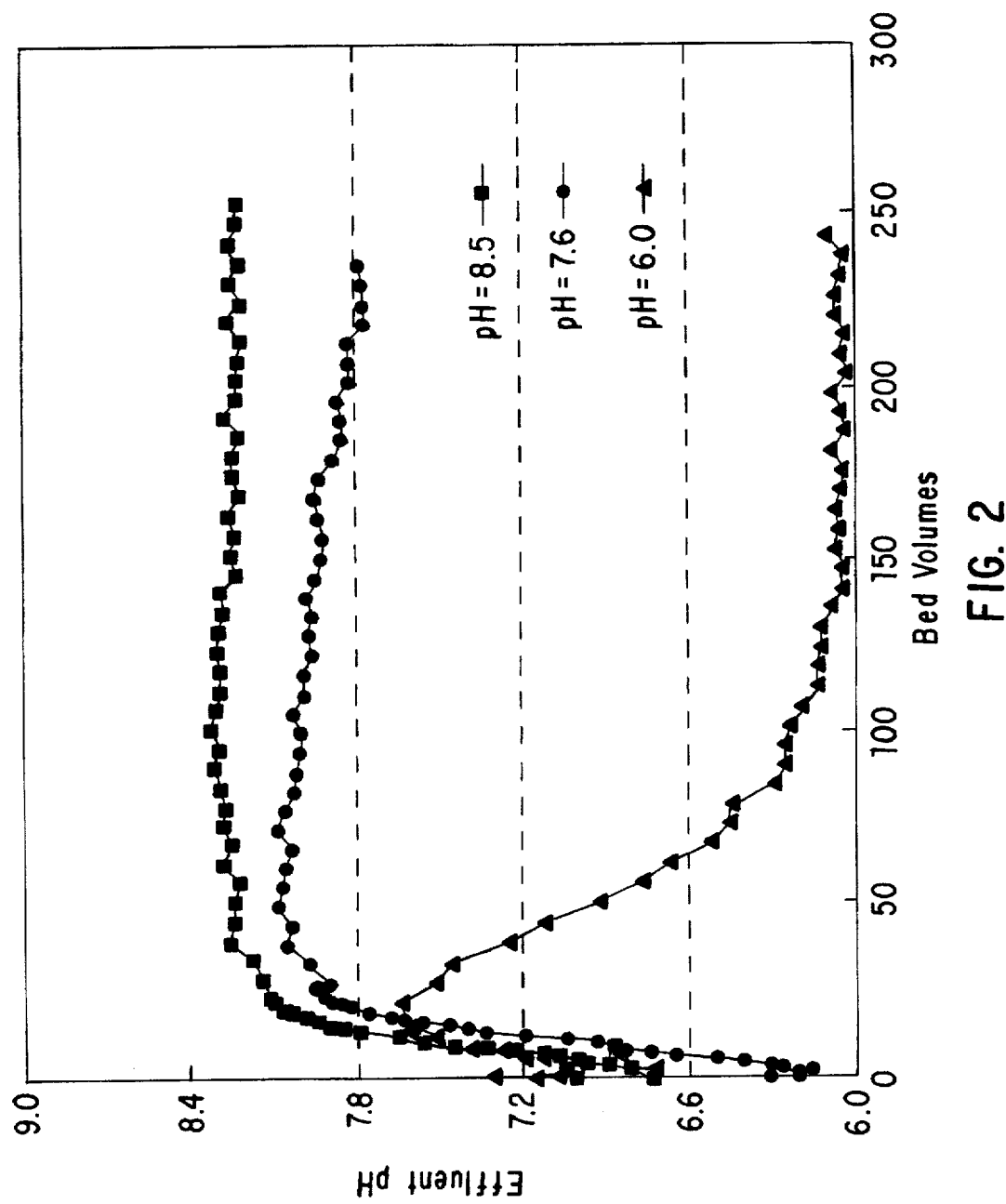
FIG. 2 graphically illustrates that the performance of the carbons of the present invention are not dependent upon the influent water pH.

Testing was performed with one inch inside diameter, Pyrex glass columns. The columns used for the carbon dioxide or the carbon dioxide/air contacting were 12 inches long and contained either 50 cc or 100 cc of activated carbon. Prior to contacting the carbon with carbon dioxide, the carbon was wetted by soaking in tap water in a beaker for about 16 hours. The wet carbon was then transferred to the 12 inch column, the water drained from the column, and the gas flow began. The total gas flow was measured with the use of a calibrated rotameter and stop watch. After completing the gas contact in those tests using 100 cc of activated carbon, one half of the treated carbon was tested for contact pH (Calgon Carbon Corporation Test Method TM-70) and the other half was transferred to a six-inch long column to measure the effluent water pH profile. The columns used for developing the pH profile were six inches long and contained 50 cc of activated carbon. The water passed through the six-inch column was Robinson Township Municipal Authority tap water. The flow rate was 10 cc/min for an empty bed contact time of 5 minutes. The pH of the column effluent was monitored continuously using an in line pH electrode. In those tests using 50 cc of activated carbon, only the contact pH was measured.

Analytical

The contact pH of the activated carbon, prior to and following treatment with carbon dioxide or carbon dioxide and then air, was determined by contacting 50 cc of the activated carbon with 100 cc of a sodium sulfate solution for thirty minutes. The sodium sulfate solution was prepared from water obtained from a Milli-Q Plus water treatment system (Millipore Corp. Bedford, Mass.) and Fisher Certified ACS grade sodium sulfate (Fisher Scientific Corp. Pittsburgh, Pa.) such that the sulfate concentration in the water was 80 mg/L. The sulfate solution was added to a beaker containing the carbon and gently stirred for 30 minutes with a magnetic stirrer. At the end of this 30 minute time period, stirring was stopped and the pH of the solution was measured.

Activated Carbons

Tests to illustrate the present invention were performed using several different types of activated carbon. These activated carbon types included both virgin and reactivated activated carbon representing several different mesh sizes. The carbons selected were typical of those used to treat air and liquid streams. The carbons evaluated included BPL 4×6, F300 8×30, React AW 8×40, F400 12×40, and PCB 20×50 (Manufactured by Calgon Carbon Corporation, Pittsburgh, Pa.). All of the products tested were bituminous coal based carbons with the exception of PCB which is a coconut based carbon.

Carbon Processing According to the Present Invention

Carbons were treated with carbon dioxide ($CO_2$) or $CO_2$ and then air in a one-inch ID by 12 inch long Pyrex glass column as described in the previous Experimental section. For the treatments with $CO_2$, the $CO_2$ gas volume ranged from one bed volume (approximately 100 cc) to 240 bed volumes. A bed volume is the gas volume equivalent to the volume of activated carbon. The volume of activated carbon is the weight of activated carbon divided by the apparent density of the activated carbon. The carbon dioxide flow rate was typically set at 100 cc/min or 1 bed volume each minute so that the total treatment time ranged from one minute to four hours. For the treatments with carbon dioxide and then air, the $CO_2$ flow rate was set at 100 cc/min and the treatment time with carbon dioxide was set at five minutes. This treatment was followed by injecting air at a flow rate of 100 cc/min (1 bed volume each minute). The total air treatment time ranged from 5 minutes to 60 minutes.

Table 1 shows that treatment of a wet F400 activated carbon with carbon dioxide reduces the carbon contact pH to acceptable levels (less than about 8.5 to 9.0) with as little as 0.1 liters (or one bed volume) of gas for 0.1 liters of activated carbon. This reduction in contact pH is sufficient to prevent the pH excursion that occurs with untreated F400 carbon, as exhibited in FIG. 1 using Robinson Township tap water as the influent water. The data in Table 1 also show that the treatment of the carbon with $CO_2$ can be conducted either upflow or downflow as very similar carbon contact pH measurements are obtained.

Table 1 demonstrates that treatment of wetted activated carbon with carbon dioxide reduces the contact pH of that carbon to levels that are generally considered to be acceptable. In those situations where further pH reduction in the water treatment system effluent is desired, the $CO_2$ treatment can be followed by treatment with air, to result in additional reduction in the water treatment system effluent pH. Air is used to illustrate the effect of a gas containing oxygen. As shown in FIG. 1, when carbon treated with carbon dioxide alone is first brought on line, the initial water effluent pH is about 6.2 and a maximum effluent pH of 8.5 can typically be expected. However, by following the carbon dioxide with air, the maximum effluent pH decreases, as depicted in FIG. 1. This process can be utilized for systems that require a water pH closer to neutral. Table 2 also shows that the modified contact pH of the carbon treated first with carbon dioxide and then air remains in the region that is classified as a pH stable carbon, i.e., below about 8.5 to 9.0 for extended air volume treatment.

The carbon dioxide treatment or the carbon dioxide and air treatment to reduce carbon contact pH for activated carbon can be applied to many types of activated carbon. As shown in Table 3, the carbon dioxide or the carbon dioxide/air treatment can be applied to carbon of various mesh size. Also, the processes can be applied to reactivated carbon and can result in a contacty pH of 7.3. Finally, the process can be applied to coconut base carbon (PCB 20×50). This is an improvement over the prior art which teaches ambient temperature oxidation (U.S. Pat. No. 5,368,739) as such oxidation produced a contact pH of 9.7 for coconut based carbon.

Dilute carbon dioxide can also be used in the present invention. Table 4 shows the percentage of carbon dioxide in the contacting gas is not critical. Rather, it is the volume of carbon dioxide that contacts the activated carbon. The volume of carbon dioxide required for producing an activated carbon with a contact pH at or below about 9.0 requires between one and two bed volumes of carbon dioxide irrespective of the percentage of carbon dioxide in the treating gas. Thus it is possible to utilize off gas from other processes with lower carbon dioxide partial pressure. For example combustion gas or flue gas could be used to contact wet activated carbon to produce the carbon of the present invention.

The present invention expresses gas to carbon ratios as volume to volume ratios. It is equally appropriate to convert these values using well known conversion factors and equations and express the gas to carbon ratios as volume to mass, mass to volume, or mass to mass relationships.

TABLE 1

Effect of Carbon Dioxide Volume on Activated Carbon pH

| Gas/Carbon Contact Time, min | Total Gas Volume liters | Direction of Gas Flow | Carbon pH |
| --- | --- | --- | --- |
| 0 | 0 | None | 10.6–10.7 |
| 240 | 24.0 | Downflow | 7.8 |
| 60 | 6.0 | Downflow | 7.9 |
| 15 | 1.5 | Downflow | 7.8 |
|  |  | Upflow | 7.6 |
| 10 | 1.0 | Downflow | 7.9 |
| 5 | 0.5 | Downflow | 7.9–8.0 |
| 3 | 0.3 | Downflow | 7.8 |
| 1 | 0.1 | Downflow | 8.5 |

Activated Carbon - 100 cc Filtrasorb 400 (F400)
Carbon dioxide flow rate - 0.1 L/min

TABLE 2

Effect of Carbon Dioxide Followed by Air on Activated Carbon pH

| Gas | Time Minutes | Volume Liters | Direction of Gas flow | Carbon Contact pH |
|---|---|---|---|---|
| Air | 5 | 0.5 | Downflow | 7.6–7.8 |
| Air | 15 | 1.5 | Upflow | 8.3 |
| Air | 60 | 6.0 | Downflow | 8.5 |

Activated carbon - 100 cc of Filtrasorb 400 (F400)
Carbon dioxide flow rate - 0.1 L/min for 5 minutes in all cases

TABLE 3

Effect of Activated Carbon Particle Size

| Carbon | Gas | Volume Liters | Carbon Contact pH |
|---|---|---|---|
| BPL 4x6 | CO2/Air | 0.5/0.5 | 8.7 |
| BPL 4x6 | CO2 | 0.5 | 8.8 |
| F300 8x30 | CO2 | 0.5 | 7.7 |
| React AW 8x40 | CO2 | 0.3 | 7.3 |
|  |  | 0.5 | 7.3 |
| PCB 20x50 | CO2 | 0.5 | 8.2 |

Gas flow rate - 0.1 L/min

TABLE 4

Effect of Dilute Carbon Dioxide on Activated Carbon pH

| Percent Carbon Dioxide | Total Gas Volume, cc | Carbon Dioxide Volume, cc | Carbon Contact pH |
|---|---|---|---|
| 10 | 500 | 50 | 9.2 |
| 10 | 6000 | 600 | 8.4 |
| 20 | 200 | 40 | 9.6 |
| 20 | 400 | 80 | 9.0 |
| 20 | 800 | 160 | 8.4 |
| 50 | 100 | 50 | 9.5 |
| 50 | 200 | 100 | 8.7 |
| 50 | 500 | 250 | 8.3 |

Activated Carbon - 50 cc of Filtrasorb 400
Gas Flow Rate - 0.1 L/min
Gas Composition - Carbon dioxide and Nitrogen While presently preferred embodiments of the invention have been described in particularity, the invention may be otherwise embodied within the scope of the appended claims.

What is claimed is:

1. A process for producing an activated carbon having a contact pH below about 9.0 comprising the steps of:

a. wetting an activated carbon with water to produce a wet activated carbon and b. contacting said wet activated carbon with a gas comprised substantially of carbon dioxide wherein the amount of carbon dioxide contacted with said wet activated carbon is greater than about one bed volume of said carbon dioxide.

2. A process as set forth in claim 1 wherein said wet activated carbon is contacted with air after said contacting with carbon dioxide.

* * * * *

UNITED STATES PATENT AND TRADEMARK OFFICE
CERTIFICATE OF CORRECTION

PATENT NO. : 5,714,433
DATED : February 3, 1998
INVENTOR(S) : FARMER, Richard W.; KOVACIC, Susan L.; MATVIYA, Thomas M.; WADHWA, Netar P.

It is certified that error appears in the above-identified patent and that said Letters Patent is hereby corrected as shown below:

In Column 4, line 25, the word "contacty" should be "contact"

In Column 5, Table 3, line 21, "C02" should be "CO2"

In Column 5, Table 3, line 22, "C02" should be "CO2"

In Column 5, Table 3, line 23, "C02" should be "CO2"

In Column 5, Table 3, line 25, "C02" should be "CO2"

Signed and Sealed this

Seventh Day of September, 1999

Attest:

Q. TODD DICKINSON

*Attesting Officer*     *Acting Commissioner of Patents and Trademarks*